United States Patent [19]

Kubozono et al.

[11] Patent Number: 4,910,678
[45] Date of Patent: Mar. 20, 1990

[54] FAILURE MEMORY DEVICE

[75] Inventors: Tsutomu Kubozono; Minoru Tatemoto, both of Tokyo; Shigeaki Hirano; Hirotoshi Maekawa, both of Himeji, Japan

[73] Assignee: Mitsubishi Denki Kabushiki Kaisha, Tokyo, Japan

[21] Appl. No.: 175,298

[22] Filed: Mar. 30, 1988

[30] Foreign Application Priority Data

Mar. 31, 1987 [JP] Japan .............................. 62-47756[U]
Mar. 31, 1987 [JP] Japan .............................. 62-46823[U]

[51] Int. Cl.$^4$ ............................................. G06F 15/20
[52] U.S. Cl. .................................. 364/424.04; 340/438
[58] Field of Search .................... 364/424.03, 424.01, 364/424.04; 340/551, 52 R, 52 F, 438; 371/18, 17, 21, 11; 73/489, 490, 491, 117.3

[56] References Cited

U.S. PATENT DOCUMENTS

| 4,072,850 | 2/1978 | McGlynn | 340/52 F |
| 4,271,402 | 6/1981 | Kastura et al. | 340/52 F |
| 4,398,258 | 8/1983 | Naitoh et al. | 364/424.03 |
| 4,404,639 | 9/1983 | McGuire et al. | 364/551 |
| 4,500,868 | 2/1985 | Tokitsu et al. | 364/424.04 |
| 4,551,801 | 11/1985 | Sokol | 364/424.03 |
| 4,748,843 | 6/1988 | Schäfer et al. | 73/117.3 |

FOREIGN PATENT DOCUMENTS 2824190 12/1979 Fed. Rep. of Germany .
2918956 11/1980 Fed. Rep. of Germany .
3121645 12/1982 Fed. Rep. of Germany .
61-32173  7/1986 Japan .

OTHER PUBLICATIONS

"Microprocessor Controls Engine and Transmission." Based on Society of Automotive Engineers Paper 830423 by Ono et al., Automotive Engineering, vol. 91, No. 8 (Aug. 1983), pp. 42-45.

Primary Examiner—Gary Chin
Attorney, Agent, or Firm—Oblon, Spivak, McClelland, Maier & Neustadt

[57] ABSTRACT

A failure hysteresis memory device which is constructed with a vehicle-side connector to be connected to a plurality of electronic control devices mounted on the vehicle; a tester-side connector to be connected to a trouble-diagnosis multi-function tester or a display device; signal conversion device for converting a signal from the vehicle-side connector to produce an output signal to the tester-side connector; a memory unit to store therein the output signal converted by the signal conversion means; and a micro-computer which processes information contained in the input signal and controls the constituent members.

4 Claims, 2 Drawing Sheets

FAILURE MEMORY DEVICE

BACKGROUND OF THE INVENTION

1. Field of the Invention

This invention relates to a failure memory device which is capable of memorizing failure condition being monitored by electronic control units (ECU).

2. Discussion of Background

Remarkable development has been attained in recent years in equipping automobiles with more and more electronic appliances, as the result of which those electronic control units (ECU) equipped in those automobiles become corresponding to each and every function of the constituent parts in the automobile. As the example of these ECU's, there are those for electronically controlled suspension device, 4-speed automatic power transmission device (4-A/T), automatic cruising device, electronically controlled fuel injection device, and so forth. For each of these ECU's, the so-called "diagnosis signals (trouble-diagnosis output signals)", or error codes of these ECU's, are produced as an output through one signal line. The trouble-diagnosis output signals to be produced from n-number of electronic control units ECU-1 to ECU-n are collected into a diagnosis connector provided in, for example, a fuse box. Then, a connector to the side of the diagnosis tester (not shown in the drawing) is inserted into this diagnosis connector so as to light up by the trouble-diagnosis output signals those light-emitting-diodes provided in the diagnosis tester.

However, with the conventional diagnosis tester, it is only possible to light up the above-mentioned light-emitting-diodes, but it is not possible to store in advance those input signals from each of the sensors to be introduced into the ECU's, and to analyse the nature of various failures or troubles when they take place.

SUMMARY OF THE INVENTION

It is therefore the primary object of the present invention to provide a failure memory device which is capable of memorizing the failure of the ECU's According to the present invention in general aspect of it, there is provided a failure memory device which comprises: a vehicle-side connector to be connected to a plurality of electronic control units mounted on the vehicle; a tester-side connector to be connected to a trouble-diagnosis multi-function tester or a display device; signal conversion means which converts a signal from the above-mentioned vehicle-side connector to produce an output signal to the tester-side connector; a memory unit which stores therein the output signal converted by the signal conversion means; and a micro-computer for processing information with respect to the input, signals and for controlling the conversion and memory of the above-mentioned constituent members.

The foregoing object, other objects as well as specific construction and function of the failure memory device according to the present invention will become more apparent and understandable from the following detailed description thereof, when read in conjunction with the accompanying drawing.

BRIEF DESCRIPTION OF THE ACCOMPANYING DRAWING

DETAILED DESCRIPTION OF PREFERRED EMBODIMENTS

In the following, the failure memory device according to one embodiment of the present invention will be described in reference to the accompanying drawing.

Figure 1:
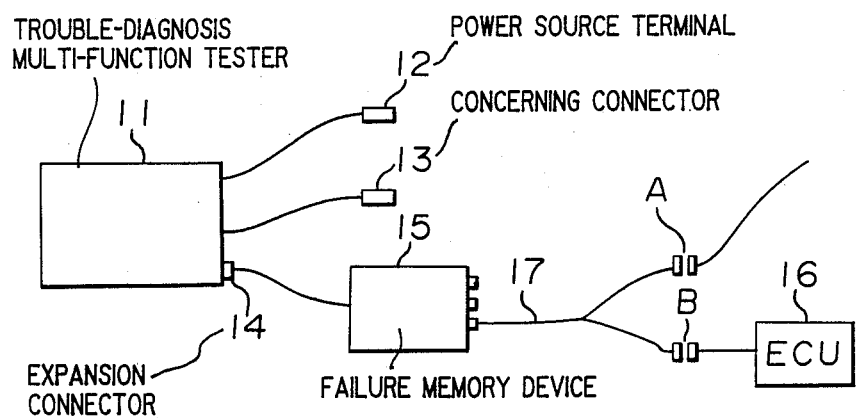
FIG. 1 is a shematic connection diagram showing an example of use of the failure memory device according to one embodiment of the present invention.

Referring to FIG. 1, a reference numeral 11 designates a trouble-diagnosis multi-function tester. This trouble-diagnosis multi-function tester 11 is capable of receiving at high speed the trouble-diagnosis signal or memory information to be produced as the output from the ECU's (electronic control units) mounted on the vehicle, or emitting test signals such as actuator driving signal, etc. to the side of the ECU's. The trouble-diagnosis multi-function tester 11 takes its power from a power source terminal 12 such as a cigarette lighter (the cigarette lighter itself not being shown in the drawing). Further, a numeral 13 refers. to, for example, a centralized connector having for example 12 pins. A numeral 14 refers to, for example, an expansion connector having for example seven pins, which is capable of effecting the full double-serial communication. Moreover, there is connected to this expansion connector 14 the failure memory device 15 according to the present invention. It is a usual practice to connect the vehicle-side harness, in which the connectors A and B are connected, with the ECU to thereby produce various output sensor signals from the vehicle-side harness to the ECU 16. In case i is desired to detect such various sensor signals by the above-mentioned trouble-diagnosis multi-function tester 11, a branch harness 17 is connected between the connectors A and B, whereby the signals from the vehicle-side harness are sent out to the trouble-diagnosis multi-function tester 11 as well as to the ECU 16.

Figure 2:
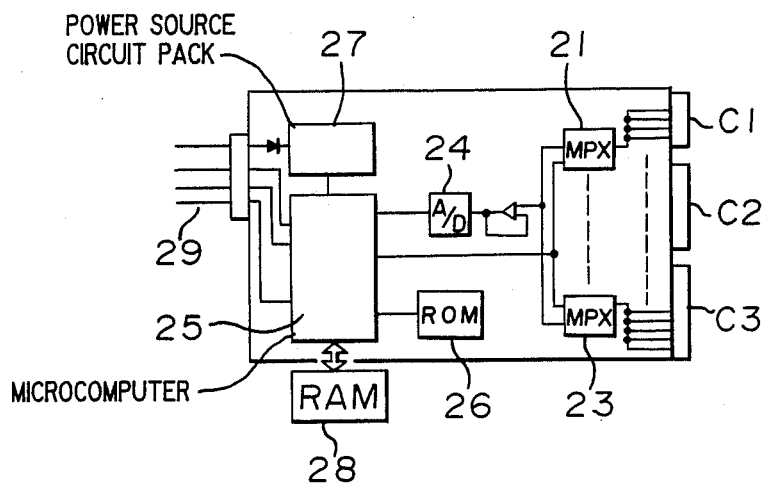
FIG. 2 is a schematic wiring diagram of the failure memory device.

In the following, explanations will be given, in reference to FIG. 2, as to the detailed construction of the failure memory device 15. In the drawing, a reference letters Cl to C3 designate connectors having pins which are equal in number to those of a plurality of connectors for the ECU's mounted on the vehicle. For example, the connector Cl has 13 pins, while the connector C2 has 17 pins. The signals which pass through the connectors C1 to C3 are selected by multiplexers 21 to 23, converted into digital signals by an A/D converter 4, and introduced into a micro-computer 2. In this micro-computer 25, there is affected parallel/serial (P/S) conversion of a signal passing through the A/D converter 24. This micro-computer 25 produced output selection signals s to the multiplexers 21 to 23. A reference numeral 26 designates a control ROM (read-only-memory) pack, a numeral 27 refers to a power source circuit pack, and a numeral 28 refers to a RAM (random-access-memory) pack which stores therein the failure. To the micro-computer 25 and ROM 26, there is connected a signal line through a harness 29 which is connectable to the expansion connector 14.

In the following, explanations will be given as to the operation of the failure memory device according to one embodiment of the present invention.

First of 111, when it is desired to diagnose, by means of the trouble-diagnosis multi-function tester 11, an output sensor signal from the vehicle-side harness which is connected to the ECU 16, through a particular signal line, the branch harness 17 is connected between the connectors A and B, as shown in FIG. 1, and then a harness 29 of an failure memory device 15 is connected to the expansion connector 14 for the tester 11. Here, explanations will be made by taking a case, in which the branch harness 17 is connected to the connector C3, as an example. In this case, the multiplexer 23 is selected by the selection signal from the microcomputer 25. On account of this, an output signal from the vehicle-side harness is converted into a digital signal by the A/D converter 2 through the multiplexer 23, further converted into a serial signal by the controlling operation of the micro-comuter 25, and stored in the RAM 28. This stored signal is then transmitted to the expansion connector 14 through the harness 29. In this way, it becomes possible to transmit the parallel signal from the ECU 16 to the trouble-diagnosis multi-function tester 11 after its conversion into the serial signal.

By the way, when it is desired to detect signals from any ECU other than the ECU 16, a connector having the same number of pin as that of the ECU concerned is selected from the connectors C1 to C3, after which the same process as mentioned in the foregoing may be affected.

As has so far been described in detail, according to the embodiment of the present invention, since the memory for storing the failure of the ECU is provided, it is possible to realize a failure memory device capable of checking accurately any failure in various types of ECU.

Figure 3:
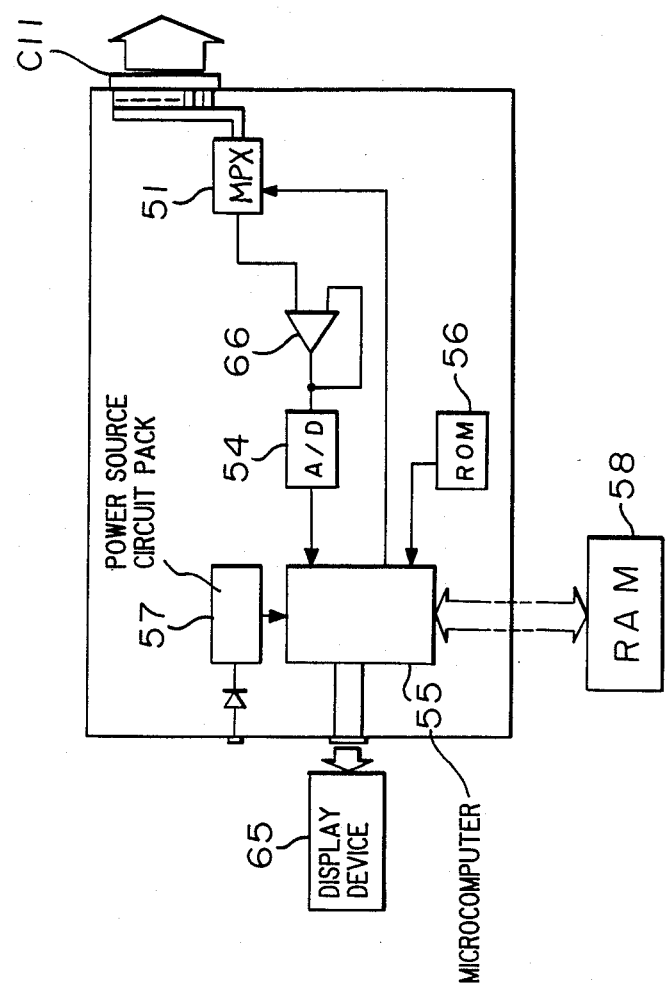
FIG. 3 is a block diagram showing the failure memory device according to another embodiment of the present invention.

FIG. 3 illustrates another embodiment of the present invention. This second embodiment is an improvement in the above-mentioned first embodiment. That is to say, the previous embodiment is to diagnose presence or absence of abnormalities in the control systems by introducing into the trouble-diagnosis multi-function tester an output signal for checking abnormality which is produced from each of the control systems, displaying the signal in a signal pattern, and comparing it with a regular signal pattern; however, in this system, since the checking signal pattern to be repeatedly introduced as input from each control system is displayed in real time, if and when certain abnormality occurs frequently, such abnormal signal can be immediately verified, while, in the case of temporary trouble which occurs from time to time or in rare occasion, it is very difficult to as certain the abnormal signal accompanied by such trouble, which inevitably requires a long period of time to search out the cause for trouble.

In FIG. 3, a reference numeral 55 designates a microcomputer constituting the controlling unit of this failure memory device according to the present invention. This micro-computer 55 operates in response to the control programs which have been stored in advance in a ROM 56, and functions to control the signal selecting operation by a multiplexer 51, the writing operations of the control data to a RAM 58, the data outputting operation to a display device 65, and so forth. The multiplexer 51 is to selectively introduce there into various input control data through the centralized connector C11 connected to the vehicle-side diagnosis terminal, in accordance with the selective control signal from the micro-computer 55. The control data which have been selectively introduced into this multiplexer through the connector C11 are converted into serial data by an A/D conversion ciruuit 54 through a buffer 66, after it is imparted to the micro-computer 55.

In more detail, in case a temporary failure occurs, for example, in the vehicle control system, the vehicle-side diagnosis terminal is connected to the failure memory device of the above-mentioned construction to render the abnormality checking signal from each control system, which can be inputted into the failure memory device. Here, if and when an operator designates a control system, in which the temporary failure is presumed to have taken place, the designated input control system data are selectively introduced into the multiplexer 51, and then transmitted to the micro-computer 55 through the buffer 66 and the A/D conversion circuit 54. Then, the designated control system data which are sent into the micro-computer 55 one after the other with passage of time are sequentially transmitted to the RAM 58 and continuously stored therein in a preset time. In this case, the input data become able to be displayed simultaneously by outputting them to the display device 65.

Namely, by continuously storing the abnormality checking data of the control system which is assumed on the basis of the state of failure, or the control operation data thereof, it is possible to catch without failure the abnormal signal from the control system which takes place rarely with the temporary trouble. By analysis of the control data stored in the RAM 58, the cause for trouble can be easily searched out, with the consequence that time needed for the trouble diagnosing work can be shortened.

Since the failure memory device according to the present invention is so constructed that various input control system data obtained from the diagnosis terminal provided in the vehicle-side harness are selectively introduced there into in accordance with an assumed place of trouble, and the control system data to be selectively inputted by the input means are continuously stored in sequence so as to enable the abnormal signal to occur rarely without failure, it is possible to realize such failure memory device which is capable of searching out the cause for trouble.

In the foregoing, the present invention has been described with particular reference to the preferred embodiments thereof. It should, however, be noted that these embodiments are illustrative only and not so restrictive, add that any changes and modifications may be made by those persons skilled in the art without departing foom the spirit and scope of the invention as recited in the appended claims.

What is claim is:

1. device for recording vehicular failures which comprises:

a vehicle-side connector to be connected to a plurality of electronic control devices which are mounted in a vehicle wherein said connector has a plurality of pins which can send and receive a plurality of signals;

a tester-side connector, to be connected to a trouble-diagnosis multi-function tester or a display device and which has a plurality of pins which can send and receive signals;

signal conversion means which converts analog signals received from said pins in said vehicle-side connector to produce a digital output signal on said pins in said tester-side connector;

a memory unit to store therein the output signal converted by said signal conversion means;

a micro-computer which processes information contained in a signal produced by said vehicle-side connector and which controls said signal conversion means and said memory means; and a multiplexer controlled by said micro-computer for selecting a given signal from the plurality of signals produced on the pins of said vehicle-side connector and for dynamically reconfiguring the connections between said vehicle-side connector and said tester-side connector.

2. A device according to claim 1, further comprising: a plurality of vehicle-side connectors are provided and wherein each of said connectors has a plurality of pins the same in number as the pins as that of said electronic control devices.

3. A device according to claim 2, further comprising:
a plurality of multiplexers; and
wherein a selection signal is produced from the micro-computer to select an appropriate one of said multiplexers.

4. A device according to claim 3, wherein a signal passing through said selected multiplexer is converted to a serial signal and stored in said memory device.

* * * * *